(12) United States Patent
Varela et al.

(10) Patent No.: US 6,302,418 B1
(45) Date of Patent: Oct. 16, 2001

(54) MODULAR SUSPENSION BEAM

(75) Inventors: Tomaz D. Varela, Gahanna; Dean M. House, Pataskala; Jason C. Phillips, Heath, all of OH (US)

(73) Assignee: Meritor SuspensionSystems Company, Troy, MI (US)

(*) Notice: Subject to any disclaimer, the term of this patent is extended or adjusted under 35 U.S.C. 154(b) by 0 days.

(21) Appl. No.: 09/556,004

(22) Filed: Apr. 20, 2000

(51) Int. Cl.[7] .................................................... B62D 21/11
(52) U.S. Cl. ............................. 280/124.109; 280/124.1; 280/124.157
(58) Field of Search ..................... 280/124.1, 124.151, 280/124.109, 124.157, FOR 159, FOR 168

(56) References Cited

U.S. PATENT DOCUMENTS

| 3,055,448 | * | 9/1962 | Fagel . | |
| 5,005,849 | * | 4/1991 | Gandiglio et al. | 280/124.109 |
| 5,433,287 | * | 7/1995 | Szalai et al. | 280/688 |

FOREIGN PATENT DOCUMENTS

| 1057469 | * | 5/1959 | (DE) | 280/FOR 159 |

* cited by examiner

*Primary Examiner*—Eric Culbreth
(74) *Attorney, Agent, or Firm*—Carlson, Gaskey & Olds

(57) ABSTRACT

A suspension beam is provided which has modular end pieces. The end pieces are designed to correspond to the particularly desired mount locations for suspension elements in a particular vehicle which is to receive the suspension beam. The locations are thus designed into each end piece and allow the suspension manufacturer to manufacture a single central portion, with end portions individually tailored for the particular vehicle. In this way, design and manufacture costs are substantially reduced.

12 Claims, 3 Drawing Sheets

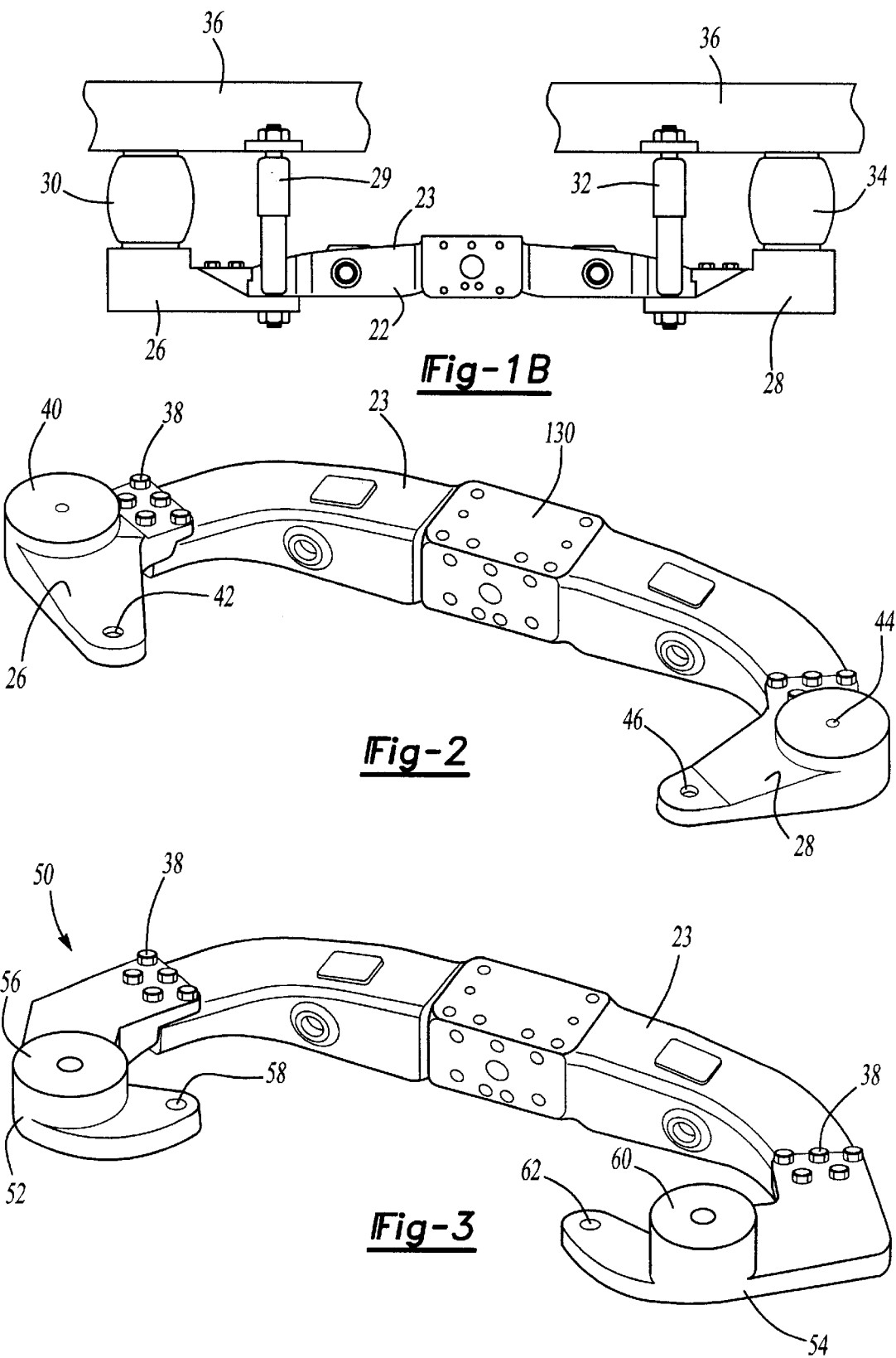

MODULAR SUSPENSION BEAM

BACKGROUND OF THE INVENTION

This invention relates to a suspension beam which extends along the length of a vehicle, and which has end portions supporting elements such as air bags, shock absorbers, etc. The suspension beam is modular, with end portions that are removable and are tailored to the individual vehicle design. A central beam portion can then be uniform across several vehicles.

Suspension beams are utilized in heavy vehicle suspensions. In particular, a suspension beam is incorporated into a so-called "H" style vehicle suspension. In such suspensions, a beam is placed at each of the lateral sides of the vehicle, and extends generally along the length of a wheel. A cross member extends between the two suspension beams. Ends of each suspension beam are connected to suspension elements such as an air bag, a shock absorber, etc.

The orientation, size and relative location of the suspension elements at the two ends of the suspension beam is unique for most vehicle designs.

Thus, there are generally distinct suspension beams designed and manufactured for each of the chassises utilized by each vehicle manufacturer. Thus, a relatively high number of suspension beams must be designed and manufactured. Each suspension beam requires individual design time and tooling. The result is that each suspension beam is relatively expensive.

SUMMARY OF THE INVENTION

In a disclosed embodiment of this invention, a number of suspension beams are designed each having a uniform central beam portion. The end portions, which vary across vehicle or chassis designs, are removable. Thus, the end portions can be tailored to the particular needs of the particular vehicle, and attached to a uniform central beam. The design and tooling costs for each suspension beam can thus be spread over several configurations.

The end portions, even though uniquely designed for each vehicle, require much less design and tooling costs when compared to the cost of each separate one-piece suspension beam.

In disclosed embodiments of this invention, the end portions are bolted to the central beam portion, and are thus easily attached. However, other attachment modes may be utilized. Moreover, a two level attachment is used to better support the weight.

These and other features of the present invention can be best understood from the following specification and drawings, the following of which is a brief description.

BRIEF DESCRIPTION OF THE DRAWINGS

FIG. 1B shows a suspension frame.

FIG. 2 shows a first arrangement beam.

FIG. 3 shows the beam of FIG. 2 having been re-configured for a distinct vehicle.

DETAILED DESCRIPTION OF A PREFERRED EMBODIMENT

Figure 1A:
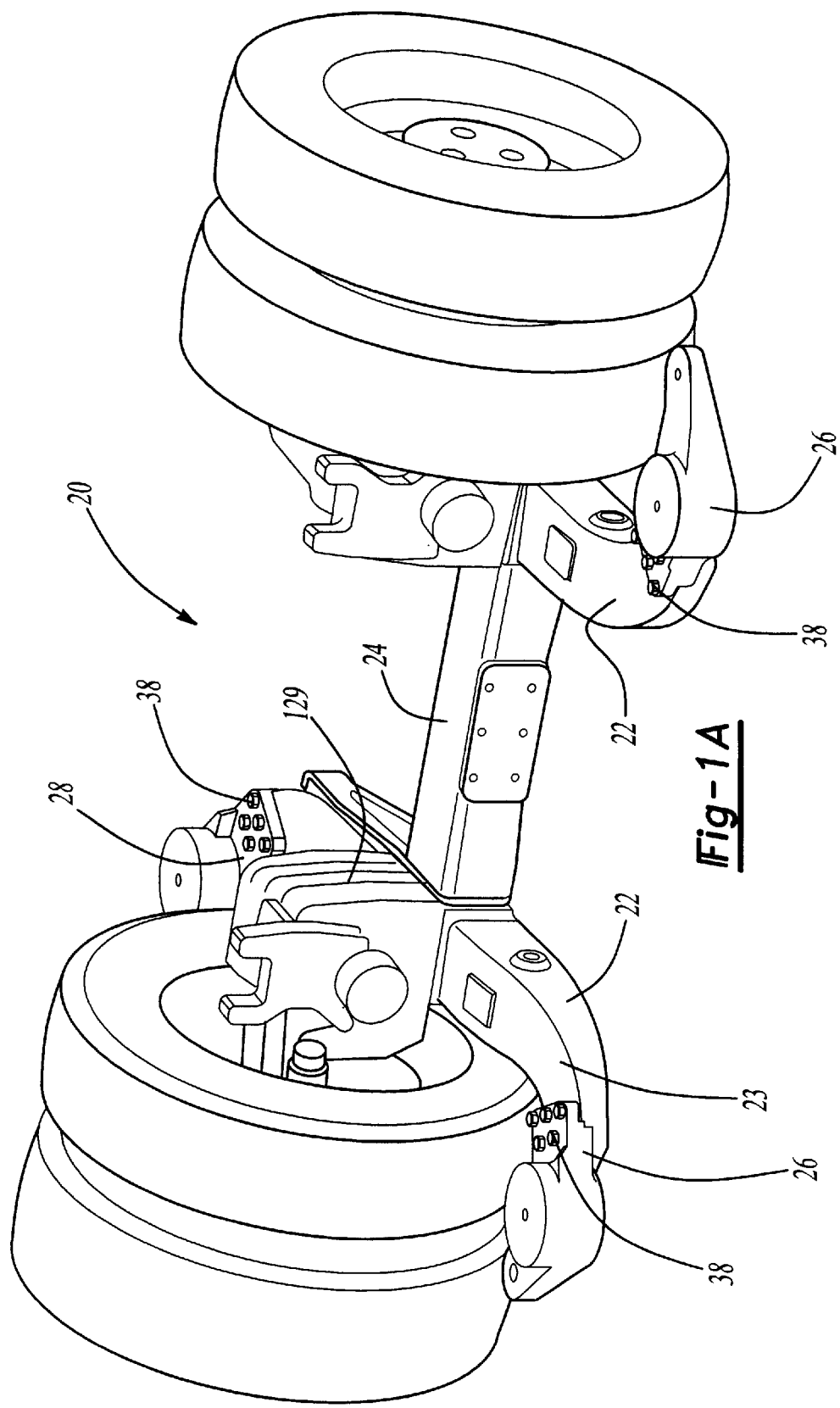
FIG. 1A is a perspective view of a vehicle suspension beam in an assembled position.

FIG. 1A shows a vehicle suspension 20 incorporating a suspension beam 22 having a central beam portion 23. As is known, a cross member 24 extends across the vehicle, and is connected to a separate suspension beam 22 at an opposed end. Beams 22 are spaced at each lateral side of vehicle and cross member 24 extends between the two.

End portions 26 and 28 are secured to ends of each central beam portion 23. A wheel mounting arrangement 129 is bolted to the top of beam 22.

As shown in FIG. 1B, suspension elements, such as shock absorber 29 and air spring 30, are secured to end portion 26. Shock absorber 32 and air spring 34 are all attached to end portions 28. Elements 29, 30, 32 and 34 are shown schematically connected to a vehicle frame at 36. Of course, other securement orientations and structure may be utilized. The vehicle frame 36 is merely shown schematically in this view.

A problem with the prior art is that the relative position, orientation and size of the components 29, 30, 32 and 34 varies across chassis and vehicle product lines. Thus, the prior art has required that individual suspension beams 22 be manufactured and designed for each individual vehicle type.

The present invention utilizes a standard central beam portion 23. The end portions 26 and 28 are secured to central beam portion 23. As shown in FIG. 1A, bolts 38 secure the end pieces.

Pads 40 and 44 for the air springs 30 and 34 and the location of the openings 42 and 46 for receiving the shock absorbers 29 and 32, are formed solely in the end portions 26 and 28. One such arrangement is shown in FIG. 2. As also shown, a bolting area 130 is bolted to arrangement 129.

As shown in FIG. 3, a second arrangement 50 can have distinct end portions 52 and 54 secured by bolts 38 to the central beam portion 23. As can be appreciated, the orientation of the shock absorber openings 58 and 62 and air spring pads 56 and 60 have changed relative to 42, 46, 40 and 44 in FIG. 2. The exact orientation, location and size of the mounting locations varies according to the individual vehicle need. The exact orientations as shown in these figures are merely examples. The present invention is directed to the concept of having removable end portions in such a vehicle suspension, such that the particular orientation and configuration of the beam 22 can be varied.

Figure 4:
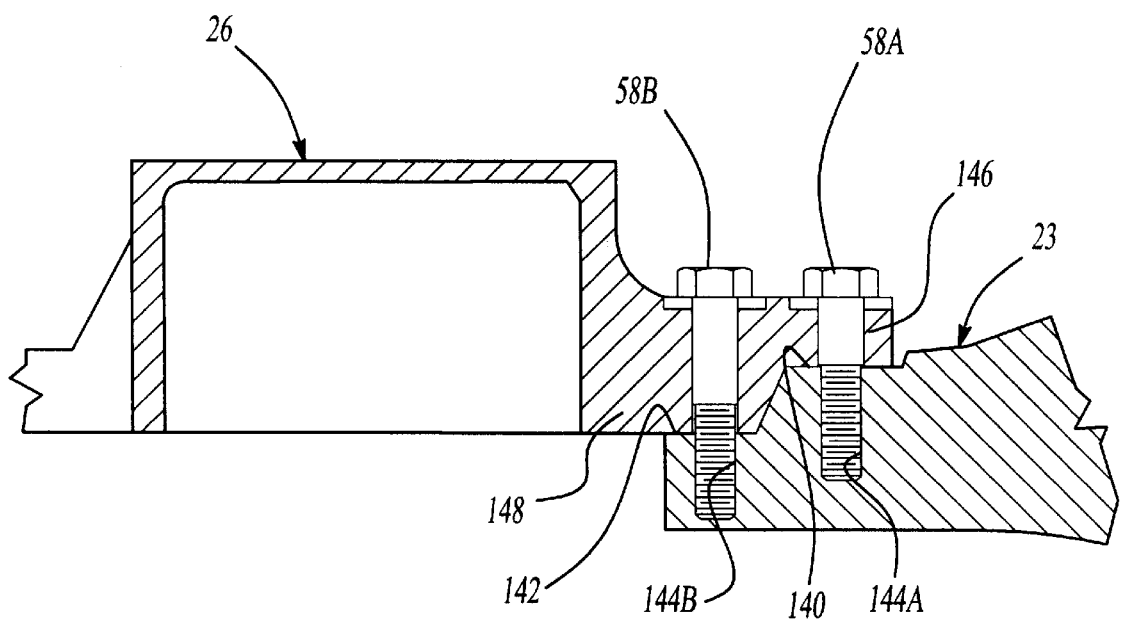
FIG. 4 shows the attachment of an end portion.

FIG. 4 shows a preferred structure for connecting the end portions 26, 28, 52 and 54 to central portion 23. As shown, central portion 23 has two support levels 140 and 142. Bolt holes 144A are formed as a blind bore in level 140 and bolt holes 144B extend through level 142. The end portions (here 26, but applicable to all end portions) have mount levels 146 and 148 which correspond to levels 140 and 142. The bolts 58B are longer than bolt 58A, as shown. This two level mount provides better ability to handle the forces that the beam must endure. However, it should be understood that other mounting structures will come within this invention. Also, while the end portions are shown as being bolted, other attachments such as welding, etc. may be used.

As can be appreciated from the figures, the end portions are cantilever mounted on the central portion of the beam. Further, end portions extend away from the central portion in a first direction, and then have a second portion extending laterally inwardly from said cantilever-mounted portion. This is clear from the drawings.

Although a preferred embodiment of this invention has been disclosed, a worker in this art would recognize that certain modifications would come within the scope of this invention. For that reason, the following claims should be studied to determine the true scope and content of this invention.

What is claimed is:

1. A beam for a heavy comprising:
   a central body portion extending laterally and generally between two spaced ends; and
   two end portions, with an end portion secured to each of said ends, said end portions configured to have mounting locations for mounting suspension elements at a location corresponding to a particular location on a vehicle which is to receive said beam, said central portion having two distinct mount levels at said spaced ends, and said end portions having mount levels that corresponding to said mount levels on said central body portion.

2. A beam as recited in claim 1, wherein said end portions are secured by bolts.

3. A vehicle suspension sub-assembly incorporating:
   a pair of laterally spaced beams and a central connecting member extending laterally between said beams, each of said pair of spaced beams having a central portion extending along an axial distance between two ends; and
   end portions attached to each of said ends of said central portion, each of said end portions having mounting locations for mounting suspension elements at a particularly desired location for a vehicle which is to receive said suspension sub-assembly, said central portion having two distinct mount levels at each of said spaced ends, and said end portions having mount levels that correspond to said mount levels on said central portion.

4. A sub-assembly as recited in claim 3, wherein said end portions are secured by bolts.

5. A beam for a heavy vehicle comprising:
   a central body portion extending generally laterally between two spaced ends; and
   two end portions, with an end portion cantilever-mounted to each of said spaced ends, said end portions configured to have mounting locations for mounting suspension elements at a location corresponding to a particular location on a vehicle which is to receive said beam.

6. A beam as recited in claim 5, wherein said end portion extend away from said end of said central body portion in a first direction, and then extend laterally inwardly from said first cantilever-mounted portion.

7. A beam as recited in claim 5, wherein said central body portion has two distinct mount levels at said spaced ends, and said end portions have mount levels that correspond to said mount levels on said central body portion.

8. A beam as recited in claim 7, wherein bolts extend through both of said mount levels, with said bolts being differing lengths to account for said different mount levels.

9. A vehicle suspension sub-assembly incorporating:
   a pair of laterally spaced beams and a central connecting member extending laterally between said beams, each of said pair of spaced beams having a central portion extending along an axial distance between two ends; and
   end portions attached to each of said ends of said central portion, each of said end portions having mounting locations for mounting suspension elements at a particularly desired location for a vehicle which is to receive said suspension sub-assembly, said end portions being cantilever-mounted to said ends of said central portion.

10. A sub-assembly as recited in claim 9, wherein said end portions extend away from said end of said central body portion in a first direction, and then extend laterally inwardly from said first cantilever-mounted portion.

11. A sub-assembly as recited in claim 9, wherein said central portion has two distinct mount levels at said spaced ends, and said end portions have mount levels that correspond to said mount levels on said central portion.

12. A sub-assembly as recited in claim 11, wherein bolts extend through both of said mount levels, with said bolts being different lengths to account for said different mount levels.

* * * * *